United States Patent [19]
Lindsay

[11] Patent Number: 5,682,359
[45] Date of Patent: Oct. 28, 1997

[54] HYDROPHONE RETRIEVAL MECHANISM AND SYSTEM

[75] Inventor: Bailey Lindsay, Houston, Tex.

[73] Assignee: Geo Space Corporation, Houston, Tex.

[21] Appl. No.: 682,459

[22] Filed: Jul. 17, 1996

[51] Int. Cl.[6] .................................................. G01V 1/16
[52] U.S. Cl. ........................................ 367/188; 174/52.1
[58] Field of Search ............................ 367/188, 4, 176; 181/122; 174/52.1

[56] References Cited

U.S. PATENT DOCUMENTS

| | | | |
|---|---|---|---|
| 3,931,453 | 1/1976 | Hall, Jr. | 174/65 |
| 4,117,449 | 9/1978 | McNeel | 367/188 |
| 4,122,433 | 10/1978 | McNeel | 367/188 |
| 4,438,292 | 3/1984 | Woodall | 174/52.1 |
| 4,470,134 | 9/1984 | McNeel | 367/188 |
| 5,014,813 | 5/1991 | Fussell | 181/122 |
| 5,130,954 | 7/1992 | Fussell | 367/188 |

Primary Examiner—Ian J. Lobo
Attorney, Agent, or Firm—Fulbright & Jaworski L.L.P.

[57] ABSTRACT

A hydrophone retrieval system is described, which includes: a) a case having an interior chamber adapted to house an anchor fixture within the chamber, the case having at least one sealable opening therein adapted to accept therethrough an electric leader cable and a retrieval cable, in a water-tight manner; b) an anchor fixture disposed within the chamber, where the anchor fixture includes an anchor member portion, wherein a first end of the electric leader cable passes through a first aperture formed in the anchor member portion; c) a first end of the retrieval cable passing through a second aperture formed in the anchor member portion; d) a retrieval cable termination element attached to the first end of the retrieval cable within an interior portion of the fixture, wherein the diameter of the retrieval cable termination element is greater than the diameter of the second aperture; and e) a base member portion, wherein the anchor member and base member portions are rigidly separated from each other at a fixed distance.

12 Claims, 2 Drawing Sheets

HYDROPHONE RETRIEVAL MECHANISM AND SYSTEM

SPECIFICATION

BACKGROUND OF THE INVENTION

1. Field of the Invention

This invention relates to a hydrophone retrieval mechanism and system.

2. Brief Description of the Related Technology

A hydrophone is a type of seismic sensor housed in an enclosure to protect the sensor from the marshy environment where it is deployed and from the field crews who perform the deployment and retrieval of the hydrophone. Hydrophones were typically deployed on the bottom of shallow lakes and bays, and in such cases, retrieval was not a problem. Increasingly, however, various techniques have been used for planting hydrophones in soft marshes, making retrieval problematic.

After being planted for several hours, or several days, it becomes very difficult to extract the hydrophones from the marsh. In many cases, field crews attempt to utilize the electric leader cable attached to the hydrophone enclosure to extricate the hydrophone from the marsh or other muddy or unfriendly terrain in which it has been placed. Frequently, removal by this means is ineffective, since the tension needed to remove the hydrophone causes the leader cable to break or to become unattached from the hydrophone enclosure. In either case, the hydrophone is damaged or lost.

Thus, the need exists for an efficient, effective and secure system for providing and anchoring a retrieval cable to a hydrophone enclosure so field crews removing the hydrophone by pulling on the retrieval cable will be successful in quickly and safely removing the hydrophone enclosure from the environment in which it is placed.

SUMMARY OF THE INVENTION

The present invention is for a mechanism and system used to retrieve hydrophones in the field. This invention utilizes a separate high tension retrieval cable anchored internally within the hydrophone enclosure. Since the break strength of the retrieval cable is approximately four times that of the electrical leader cable break strength, hydrophones may be more efficiently, safely and quickly removed from marshes or other areas where use of leader cable as a means of retrieval of hydrophones may pose difficulty. A novel means of anchoring the retrieval system to the hydrophone enclosure is also disclosed herein.

DETAILED DESCRIPTION OF THE PREFERRED EMBODIMENT

Figure 1:
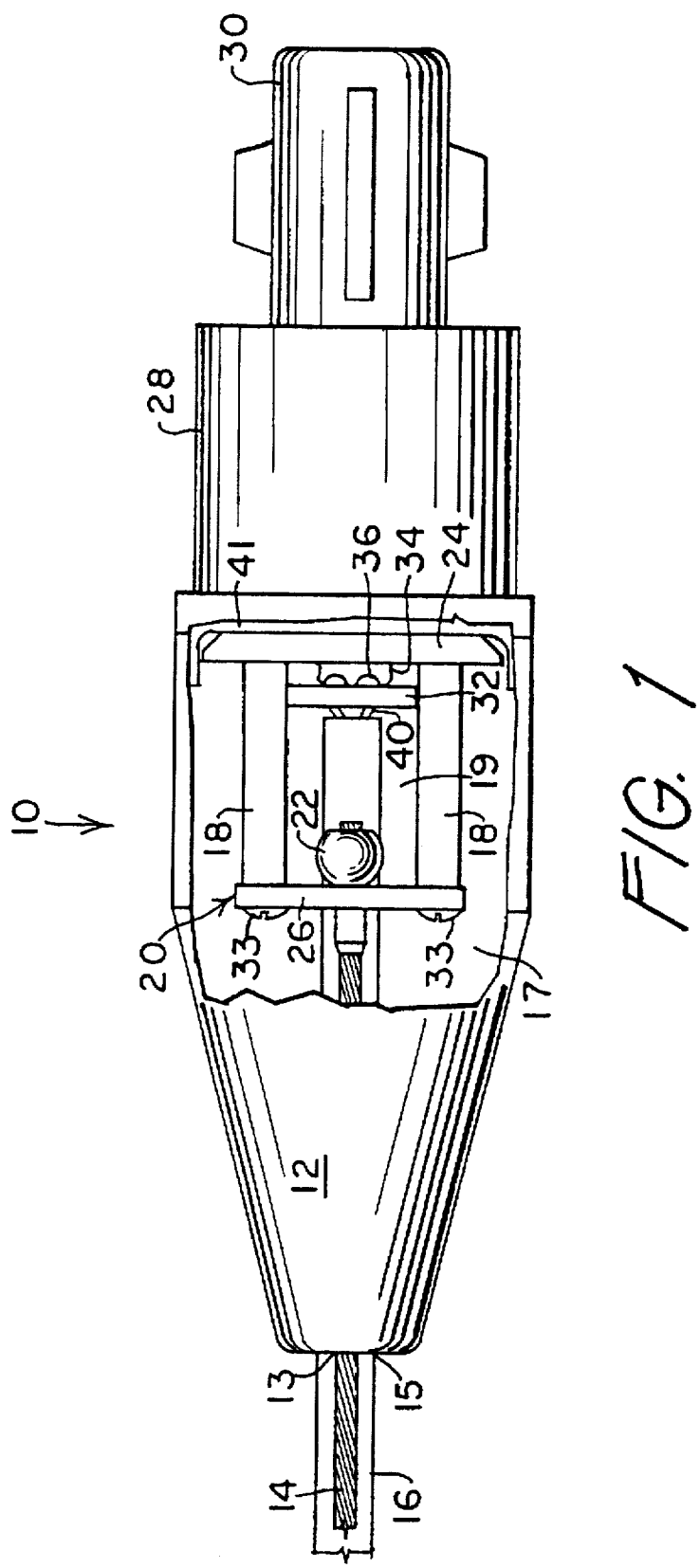
FIG. 1 is a cut-away side view of an embodiment of the retrieval mechanism of the present invention.

Referring to FIG. 1, a hydrophone assembly 10 is illustrated. A casing 12 made of waterproof injection molded plastic, or other light weight, high strength waterproof material, such as a polyether based polyurethane for example, 58863 BLK 285 Estane, 85 Durometer Shore A, manufactured by B.F. Goodrich, is shown. Casing 12 includes an interior chamber 17 for housing an anchor fixture 20 within chamber 17. The anchor fixture 20 is used to hold an electric leader cable 16 in place, and to rigidly secure a retrieval cable 14 in place, within casing 12 of hydrophone assembly 10.

The anchor fixture 20 is made up of an anchor member portion 26 and a base member portion 24 separated by a wall, or partition, preferably by a plurality of standoffs 18. Standoffs 18 are preferably secured to anchor member portion 26 and base member portion 24 by use of screws 33. Other methods of attachment, such as rivets or welding may be used. The anchor member portion 26 and base member portion 24 are fixedly secured to each other such that they remain substantially parallel to each other at a fixed distance.

Figure 2:
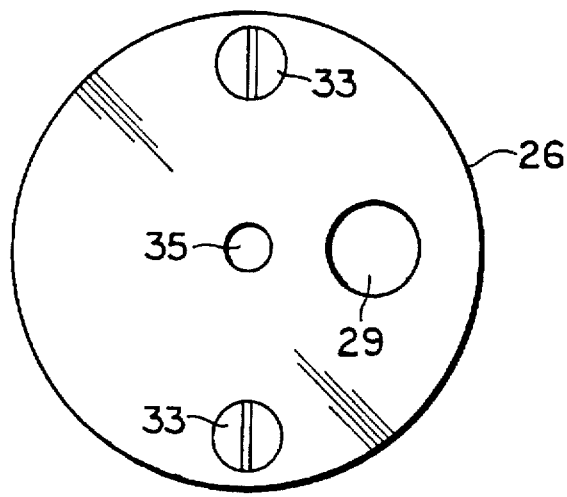
FIG. 2 is a plan view of the anchor member portion of the anchor fixture of the present invention.

Anchor member portion 26 is preferably a disc-shaped member, as shown in FIG. 2, and is preferably a light weight, high strength metal, such as aluminum. Other metals, such as steel or certain alloys, may be used. Anchor member portion 26 contains a first aperture 29 formed therein and a smaller diameter second aperture 35 formed therein.

Figure 3:
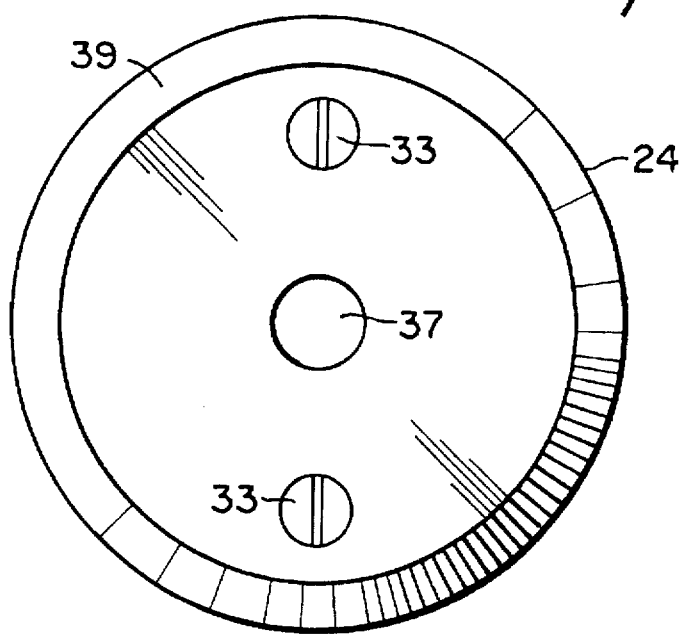
FIG. 3 is a plan view of the base member portion of the anchor fixture of the present invention.

Base member portion 24 is preferably a disc-shaped element, as shown in FIG. 3, which may contain a bevelled portion 39 on the outside perimeter of base member 24. Base member portion 24 contains a third aperture, 37 formed therein.

Referring to FIG. 1, anchor fixture 20 is fastened and secured within hydrophone assembly 10 by use of epoxy which is placed on the bottom surface of base member portion 24 to secure it to a shelf 41 formed in casing 12. Electric leader cable 16 is inserted through a first sealable opening 15 in casing 12 and then inserted through first aperture 29 formed in anchor member portion 26. Leader cable 16 extends into an interior portion 19 of anchor fixture 20, where it terminates. Electrical leads 40, which extend from leader cable 16, are fed through hydrophone connection apertures 38 formed in a water block element 32 situated within the interior portion 19 of anchor fixture 20. Hydrophone leads 34, which extend from a hydrophone disposed within case member portions 28 and 30 of hydrophone assembly 10, extend through the third aperture 37 and base member 24 to be electrically connected, via solder connections 36, with electrical leads 40.

Figure 4:
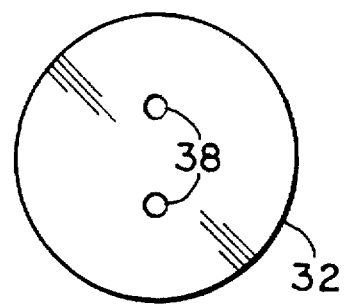
FIG. 4 is a plan view of the water block element of the present invention.

Water block element 32 (FIGS. 1 and 4) is utilized to prevent moisture from invading the hydrophone elements contained in case member portions 28 and 30. Moisture may penetrate casing 12 along the exterior of electric leader cable 16, or otherwise enter interior portion 19 of anchor fixture 20. Thus, hydrophone connection apertures 38 are very small, such that their diameter is only slightly greater than that of the electrical leads 40 from electric leader cable 16.

A retrieval cable 14 is utilized, which is a high strength metal cable, preferably ⅛ inch aircraft cable having a break strength approximately four times that of the electric leader cable 16. Retrieval cable 14 is inserted through a second sealable opening 13 in casing 12 into the chamber 17 within casing 12. In other embodiments, retrieval cable 14 may be inserted through the same sealable opening as electric leader cable 16. Retrieval cable 14 is then fed through the second aperture 35, shown in FIG. 2, of anchor member portion 26, into the interior portion 19 of anchor fixture 20. A retrieval cable termination element 22 is then fixedly attached to the end of retrieval cable 14. Termination element 22 has a diameter greater than that of the diameter of second aperture 35 so that when force is applied on the end of retrieval cable 14 when retrieving the hydrophone assembly 10 from a marsh, cable termination element 22 will not pull through second aperture 35.

Termination element 22 is preferably a steel shank ball, which is attached to the end of retrieval cable 14 by use of a hydraulic press, or other suitable clamping device. In another embodiment, a termination sleeve may be used in place of the shank ball. The other end of retrieval cable 14, not shown, is typically attached to an eye or snap-swivel hook, depending on the application for exerting a force on cable 14 to remove assembly 10 from a marsh.

Once anchor fixture 20 has been epoxied and secured into place within casing 12, the electric leader cable 16 and retrieval cable 14 are within place within fixture 20, the retrieval cable termination element 22 is attached and the electrical connections between electric leader cable 16 and the hydrophone are made, the entire interior chamber 17 is filled with polyurethane, or other high strength, light weight waterproof material, by injection molding, to secure fixture 20 and all other connections and elements within the hydrophone assembly 10.

A transformer, not shown, is housed within case member portion 28 of hydrophone assembly 10. Pressure sensitive crystals are housed within case member portion 30 of hydrophone assembly 10.

In operation, hydrophone assembly 10 is inserted into a marsh, or other area surrounded by water, by a seismic crew. After the hydrophone assembly 10 has been used for its intended purpose, retrieval is necessary. Retrieval crews remove the hydrophone assembly 10 from its location by asserting force on the end of retrieval cable 14, rather than on electric leader cable 16. Since anchor fixture 20 has been rigidly attached to the interior of casing 12 by being epoxied to shelf 41 and by being surrounded by injection molded polyurethane, exerting a force on anchor fixture 20, via retrieval cable 14, will remove the hydrophone assembly 10 from its embedded position without damaging or compromising the hydrophone/electric lead cable connections within assembly 10.

The foregoing disclosure and description of the invention are illustrated and explanatory of the preferred embodiments. Changes in the components or connections described herein may be made without departing from the spirit of the invention.

What is claimed is:

1. A hydrophone retrieval system, comprising:
   (a) a case having an interior chamber adapted to house an anchor fixture within said chamber, said case having at least one sealable opening therein adapted to accept therethrough an electric leader cable and a retrieval cable, in a water-tight manner;
   (b) an anchor fixture disposed within said chamber, said anchor fixture including an anchor member portion, wherein a first end of said electric leader cable passes through a first aperture formed in said anchor member portion;
   (c) a first end of said retrieval cable passing through a second aperture formed in said anchor member portion; and
   (d) a retrieval cable termination element attached to said first end of said retrieval cable within an interior portion of said fixture, wherein the diameter of said retrieval cable termination element is greater than the diameter of said second aperture.

2. The hydrophone retrieval system of claim 1, wherein said anchor fixture further comprises a base member portion, wherein said anchor member and base member portions are rigidly separated from each other at a fixed distance.

3. The hydrophone retrieval system of claim 2, wherein said base member and anchor member portions are substantially parallel to each other at a fixed distance.

4. The hydrophone retrieval system of claim 1, further comprising electrical leads which extend from said electric leader cable through hydrophone connection apertures formed in a water block member situated within said anchor fixture interior portion, wherein said leads are electrically connected to a hydrophone disposed within said case.

5. The hydrophone retrieval system of claim 4, wherein hydrophone electrical leads extend from said hydrophone through a third aperture formed in said base member portion of said anchor fixture to said hydrophone connection apertures, where said electrical leads and said hydrophone electrical leads are electrically connected.

6. The hydrophone retrieval system of claim 1, wherein said retrieval cable has a break strength at least four times the break strength of said electric leader cable.

7. The hydrophone retrieval system of claim 1, wherein said retrieval cable termination element attached to said first end of said retrieval cable comprises a steel shank ball.

8. The hydrophone retrieval system of claim 2, wherein said anchor member and base member portions are rigidly separated from each other at a fixed distance by a plurality of standoffs.

9. The hydrophone retrieval system of claim 1, wherein said retrieval cable comprises steel.

10. The hydrophone retrieval system of claim 1, wherein said anchor member portion comprises a disc-shaped member.

11. The hydrophone retrieval system of claim 2, wherein said base member portion comprises a disc-shaped member.

12. The hydrophone retrieval system of claim 4, wherein said water block member comprises a disc-shaped member.

* * * * *